United States Patent Office 3,076,208
Patented Feb. 5, 1963

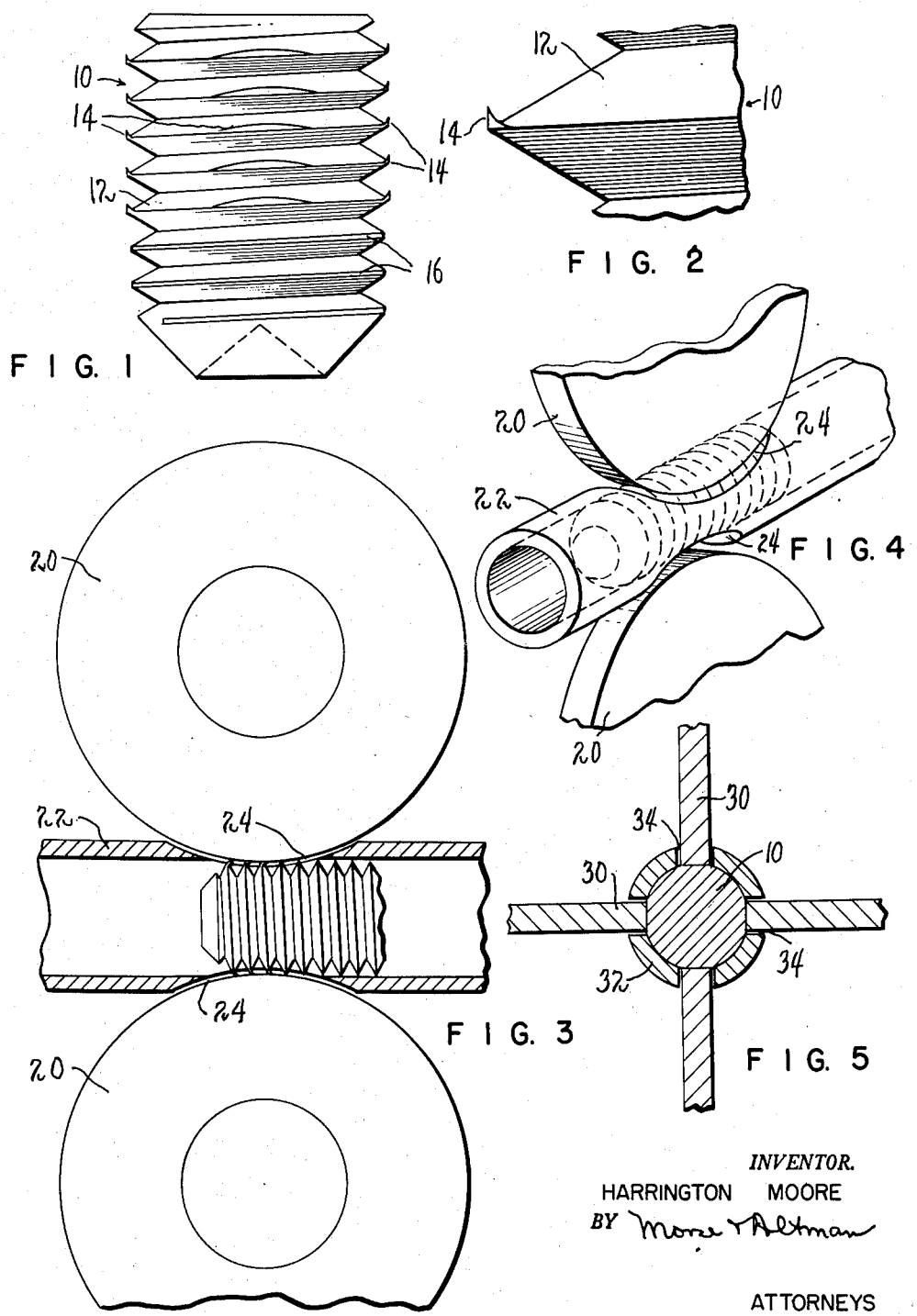
Feb. 5, 1963 — H. MOORE — 3,076,208
METHOD OF MAKING SETSCREW WITH MUTILATED THREADS
Filed April 27, 1960
INVENTOR.
HARRINGTON MOORE
BY
ATTORNEYS

---

3,076,208
METHOD OF MAKING SETSCREW WITH MUTILATED THREADS
Harrington Moore, East Acton, Mass.
(100 Beaver St., Waltham, Mass.)
Filed Apr. 27, 1960, Ser. No. 24,958
2 Claims. (Cl. 10—10)

This invention relates to screw-threaded objects such as headless setscrews, longer headless screws of various lengths for various purposes, threaded tie-rods, and the like, all collectively referred to hereinafter as screws. An object of the invention is to mutilate the thread crests of such screws slightly but sufficiently to cause a frictional drag on the flanks of the interior threads in the holes into which the screws are introduced when put to use. The crests are upset at spaced points so as to provide a moderate frictional resistance to turning which will tend to oppose loosening of the screw by vibration of the structure into which it has been inserted, but will permit the turning of the screw in either direction by the use of a suitable tool applied with sufficient force. The threaded holes into which screws are screwed are apt to vary slightly in diameter. If the hole is a trifle oversize an ordinary screw will be somewhat loose in it. The present invention is designed to avoid such looseness by modifying most of the turns of the thread in a simple manner so that looseness in an oversize hole will be avoided, but without preventing the use of the screw in a hole of correct size. According to the invention, the threads are mutilated by peening the crest of each of several turns of the thread at one or more points of the turn so that at such points the metal burr projects from the standard contour of the thread and thus bears on the flanks of the interior thread in the hole into which the screw is driven. For a more complete understanding of the invention, reference may be had to the following description thereof, and to the drawing, of which—

FIGURE 1 is an elevational view of a headless setscrew embodying the invention;

FIGURE 2 is a fragment of FIGURE 1 on a larger scale;

FIGURE 3 is a diagrammatic elevation of apparatus for mutilating a screw, a guiding tube being shown in section;

FIGURE 4 is a perspective view of the parts shown in FIGURE 3; and

FIGURE 5 is a sectional view of a modified form of the invention.

A headless setscrew 10 embodying the invention is illustrated in FIGURE 1 of the drawing. The crest of the thread turns 12 have been upset or peened over at spaced points 14 (four such points for each turn of the thread) so that at those points the resulting burrs will project out of the normal contour of the threads and will therefore bear against the flanks of the interior thread in the hole in which the screw will be inserted when put to use.

For economical production, all of the turns of the thread on a screw may be initially treated, then the first crests of the two or three turns of thread at the entering end of the screw may be shaved off as at 16 to remove the displaced burrs so that the screw can be started easily in the hole in which it is to be inserted.

Any suitable apparatus may be employed to peen the crests. For example, the screws may be fed through the nip of a pair of hardened rolls 20 which are spaced apart slightly less than the crest diameter of the screws and are rigidly supported against further separation. To ensure the proper passage of screws through the nip of the rolls 20, a tubular guide 22 may be provided, as illustrated in FIGURE 3, through which the screws may be pushed. The guide 22 has two opposed openings 24 through which enough of the edge of each roll 20 extends to engage the screws passing through the guide 22. The rolls 20 swage or peen the crests of the turns of the thread at two diametrically opposed points 14 of each turn. Thereafter, the crests of the first two or three turns of thread at the entering end of the screw are shaved off to remove the burrs 14.

The screw 10 shown in FIGURE 1 with four burrs on each turn of thread may be made by two successive passes through pairs of rolls, or by a single pass through the nip between four rolls 30 arranged as indicated in FIGURE 5 with a tubular guide 32 having four openings 34 through which the rolls extend to engage a threaded member 10.

While screw-threaded members have been described with two or four spaced burrs on each turn of the thread, these numbers are given by way of example and not limitation, and if preferred, the upsetting or flattening of the crests of the thread may be continuous on the turns which are deformed.

I claim:

1. A method of making a headless screw-threaded member frictionally resistant to being turned in a threaded hole, which comprises placing the member in proximity with a tool with the member thread in contact with the tool, relatively moving said member longitudinally with respect to the tool, thereby upsetting at least a portion of the crest of each turn of the thread, forming a burr on each turn, and shaving off the crests of a few turns of said thread at the entering end of the member to remove completely the burrs on said few turns.

2. A method of making a headless screw-threaded member frictionally resistant to being turned in a threaded hole, which comprises passing the member longitudinally through the nip of two hardened rolls spaced apart slightly less than the crest diameter of the member, whereby to form small burrs at diametrically opposite points on the crest of each turn of thread, and shaving off the crests of a few turns of said thread at the entering end of the member to remove completely the burrs on said few turns.

References Cited in the file of this patent

UNITED STATES PATENTS

| | | |
|---|---|---|
| 1,250,748 | Woodward | Dec. 18, 1917 |
| 2,135,637 | Gade | Nov. 8, 1938 |
| 2,508,291 | Porro | May 16, 1950 |
| 2,700,314 | Watkins | Jan. 25, 1955 |